United States Patent [19]
Kim et al.

[11] Patent Number: 6,087,752
[45] Date of Patent: Jul. 11, 2000

[54] MOTOR HAVING PERMANENT MAGNETS RECEIVED THEREIN

[75] Inventors: Gyeong-don Kim, Seoul; Tae duk Kim, Kyonggi-do, both of Rep. of Korea

[73] Assignee: Samsung Electronics Co., Ltd., Suwon, Rep. of Korea

[21] Appl. No.: 09/272,052

[22] Filed: Mar. 19, 1999

[30] Foreign Application Priority Data

Mar. 20, 1998 [KR] Rep. of Korea ................... 98 4174

[51] Int. Cl.⁷ .................. H02K 1/27; H02K 21/12
[52] U.S. Cl. .................. 310/156; 310/51; 310/162; 310/166; 310/168; 310/261
[58] Field of Search .................. 310/156, 269, 310/162, 166, 168, 51

[56] References Cited

U.S. PATENT DOCUMENTS

| | | | |
|---|---|---|---|
| 3,956,678 | 5/1976 | Byrne et al. | 310/168 |
| 4,127,786 | 11/1978 | Volkrodt | 310/156 |
| 4,658,165 | 4/1987 | Vanderschaeghe | 310/156 |
| 5,250,867 | 10/1993 | Gizaw | 310/179 |
| 5,378,953 | 1/1995 | Uchida et al. | 310/156 |
| 5,508,576 | 4/1996 | Nagate et al. | 310/156 |
| 5,554,900 | 9/1996 | Pop, Sr. | 310/156 |
| 5,682,072 | 10/1997 | Takahashi | 310/156 |
| 5,747,912 | 5/1998 | Sakuma et al. | 310/261 |
| 5,929,547 | 7/1999 | Kim | 310/156 |

FOREIGN PATENT DOCUMENTS

| | | | |
|---|---|---|---|
| 2162595 | 7/1973 | France | H02K 21/00 |
| 2026486 | 7/1972 | Germany | H02K 23/02 |

*Primary Examiner*—Nestor Ramirez
*Assistant Examiner*—B. Mullins
*Attorney, Agent, or Firm*—Burns, Doane, Swecker & Mathis, L.L.P.

[57] ABSTRACT

A motor having permanent magnets received therein includes a rotor having a plurality of circular sheet irons deposited in turn, a plurality pairs of magnet receiving slots formed through the deposited sheet irons at a predetermined angle toward the outer surface of the rotor, and permanent magnets of different polarities received into the magnet receiving slots, wherein a magnetic flux leakage preventive groove having a predetermined width and depth is formed at the outer surface of the rotor at the center between the pair of magnet receiving slots.

3 Claims, 7 Drawing Sheets

MOTOR HAVING PERMANENT MAGNETS RECEIVED THEREIN

BACKGROUND OF THE INVENTION

1. Field of the Invention

The present invention relates to a brushless motor having permanent magnets received therein, and more particularly, to a motor having permanent magnets in which the magnets are disposed so as to have uniform magnetic flux and a rotor for decreasing magnetic flux leakage and enhancing the usefulness of the magnetic flux is adopted.

2. Description of the Related Art

Brushless motors are gaining in popularity as the home appliances or industrial equipment becomes to have high performance, lighter weight, and more compact. In addition, motor control technique is being widely used due to the development in the areas of semiconductor technique or substances, which enhances the reliability of brushless motors.

FIG. 1 shows the structure of brushless motors, FIG. 2 shows the waveform of the current flowing at each phase shown in FIG. 1, FIG. 3A is a vector diagram illustrating the magnetic field generated from the current, and FIGS. 3B to 3E are vector diagrams illustrating the magnetic field generated according to each angle at which a rotor rotates.

As shown in FIG. 1, around a rotor 1 having two poles N and S, stator coils Lu, Lv, and Lw at which three phase current flows are arranged at 120°. In addition, one end portions of the stator coils Lu, Lv, and Lw are connected to a voltage supply source Vcc, respectively, and the other end portions of the stator coils Lu, Lv, and Lw are connected to switching elements Qu, Qv, and Qw, respectively. Switching elements are turned on or off according to the control of a driving controller 2, thereby conducting current to the coils.

As an example of using 180° conducting method, if it is assumed that the current flows each phase as shown in FIG. 2, the magnetic field is emitted at a direction from the winded coils toward rotor 1. Since the coils are disposed at 120°, respectively, the magnetic field emitted therefrom is also at 120°, as shown in FIG. 3A.

As shown in FIG. 3B, current flows at coils Lu and Lv when an electrical angle is 0°. That is, when the control signal from driving controller 2 turns the switching elements Qu and Qv on, the current flows at coils Lu and Lv, and magnetic fields Mu and Mv are generated. Then, a combined magnetic field MT1 is formed, and rotor 1 rotates in clockwise direction as shown in FIG. 3B, being affected by the combined magnetic field MT1.

When the electrical angle exceeds 60° as shown in FIG. 2, the current at coil Lv is cut off, and generating the magnetic field Mv which makes rotor 1 to be rotated in counterclockwise direction is restricted. In other words, the current flows only at the coil Lu, which generates only the magnetic field Mu. Here, rotor 1 rotates as shown in FIG. 3C, and magnetic filed Mu vector faces the center of N-pole, thereby rotating rotor 1 at the same direction.

When the electrical angle exceeds 120° as shown in FIG. 3D, the current is provided for coils Lu and Lw, and magnetic fields Mu and Mv are generated. Then, a combined magnetic field MT2 is formed, and rotor 1 rotates, being affected by the combined magnetic field MT2. When the electrical angle exceeds 180° as shown in FIG. 3E, rotor 1 rotates in counterclockwise direction. At such a state, the current for generating magnetic fields Mu and Mv that make rotor 1 to be rotated in counterclockwise direction is cut off, and the current is provided only for coil Lu so as to generate magnetic field Mw for rotating in clockwise direction.

As shown in FIGS. 3A to 3F, the magnetic field generated at the stator coils appropriately controls the current of each phase, to thereby form a rotating magnetic field. The rotor rotates according to the rotating magnetic field.

The rotating magnetic field of brushless motors is made up of the combined magnetic field of each phase. Therefore, the size of the rotating magnetic field is not regular every moment, and the torque generated by the rotating magnetic field is not uniform, which causes a ripple. In addition, the combined magnetic field interacts with the permanent magnets of the rotor according to the structure of the rotor. However, if the combined magnetic field that passes through the interior of the rotor aggregates densely at a specific portion, the magnetic reluctance increases. If the rotor has an inappropriate structure, the magnetic flux generated from the permanent magnet leaks to the adjacent magnets, which degrades a motor efficiency.

FIG. 4A shows an example of the iron sheet used for a conventional brushless motor, and FIG. 4B is a section view showing a motor to which the rotator having a series of iron sheet is applied.

To reduce the core loss generated from rotor 1, a core 40 where a series of iron plates made up of a silicon are deposited is used for rotor 1. Accordingly, rotor 1 in section view is shaped same as the core. Core 40 has at a center thereof a hole 41 into which a rotating shaft is to be pressed and fixed, holes 42 into which bolts are inserted so as to fix core 40, and slots 44 into which permanent magnets are to be received oppositely to each other from the rotating shaft. The magnetic flux generated from the permanent magnets received in slots 44 passes through the gap between rotor 1 and a stator 45 and flows toward a teeth 46 of stator 45. In other words, as shown in FIGS. 4B and 5, the magnetic flux generated from stator 45 travels teeth 46, core 40, and the permanent magnets received in slots 44, and travels again core 40, permanent magnets, and teeth 46, to thereby form a closed loop.

However, since the outer surface of the core is shaped as a circle centering from the shaft of the rotor, the portion A of the magnetic flux from the permanent magnets directly flows toward the opposite magnetic poles of the permanent magnets, as shown in FIG. 5. That is, all of the magnetic flux from the end of the permanent magnets received in the slots does not flow toward to the stator, which means the magnetic flux partially leaks as shown in portion A of FIG. 5. This occurs because the core at the end of the permanent magnet is shaped as a circle, which provides a sufficient core area for the flowing of the magnetic flux.

The leakage magnetic flux is useless since it does not affect to the rotation of the rotor, which degrades a motor efficiency.

SUMMARY OF THE INVENTION

It is therefore an object of the present invention to provide a brushless motor having permanent magnets in which the structure of the core the rotor is modified so as to minimize the leakage magnetic flux, to thereby enhance motor efficiency and reduce the cost of the substances of the core.

It is another object of the present invention to provide a brushless motor having permanent magnets in which the core of the rotor has recess portions at the outer surface thereof to which the permanent magnet having different polarities is adjacent, so as to minimize the leakage magnetic flux, to thereby reduce a torque ripple and minimize the noise and vibration.

To achieve the above objects and other advantages, there is provided a motor having permanent magnets received therein including a rotor having a plurality of circular sheet irons deposited in turn, a plurality pairs of magnet receiving slots formed through the deposited sheet iron at a predetermined angle toward the outer surface of the rotor, and permanent magnets of different polarities received into the magnet receiving slots, wherein a magnetic flux leakage preventive groove having a predetermined width and depth is formed at the outer surface of the rotor at the center between the pair of magnet receiving slots.

Preferably, the distance between the outer end of the magnet receiving slot and the outer surface of the rotor is 0.5 mm or shorter, and the distance between the sidewall of the magnetic flux leakage preventive groove and the sidewall of the magnet receiving slot adjacent to the magnetic flux preventive groove is 0.5 mm or shorter.

BRIEF DESCRIPTION OF THE DRAWINGS

The above object and other advantages of the present invention will become more apparent by describing in detail the preferred embodiments thereof with reference to the accompanying drawings, in which.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those having skill in the art.

Figure 1:
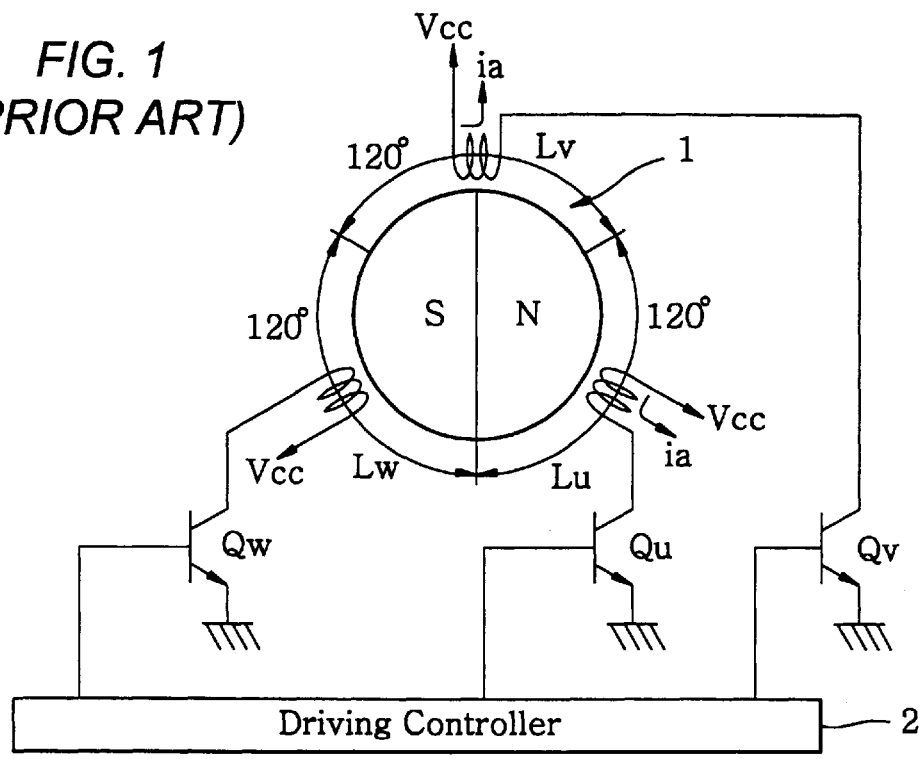
FIG. 1 illustrates an operation of a brushless motor.
Figure 2:
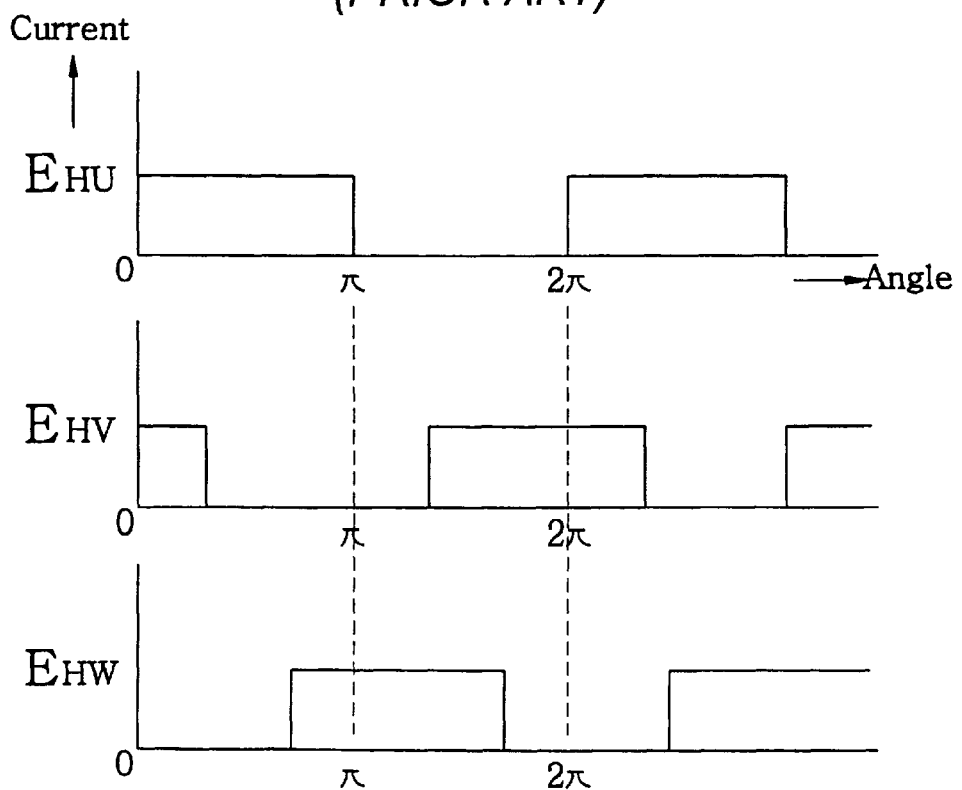
FIG. 2 illustrates waveform of the current flowing at each phase of the motor shown in FIG. 1.
Figure 3C:
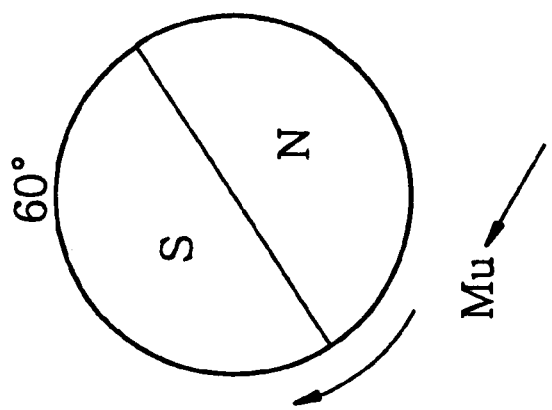
FIG. 3A is a vector diagram showing the direction of the magnetic field which is generated from the current flowing at each phase of the motor shown in FIG. 1, and FIGS. 3B to 3F are vector diagrams showing the magnetic field generated in accordance with the angle at which the rotor rotates.
Figure 3B:
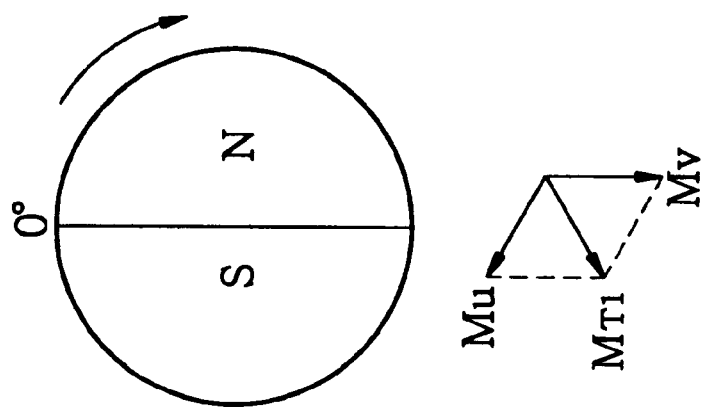
Figure 3A:
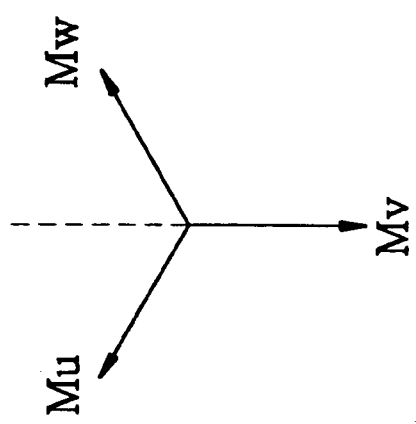
Figure 3D:
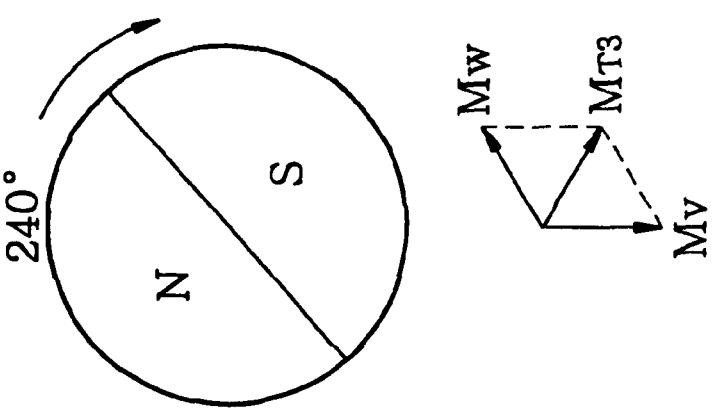
Figure 3E:
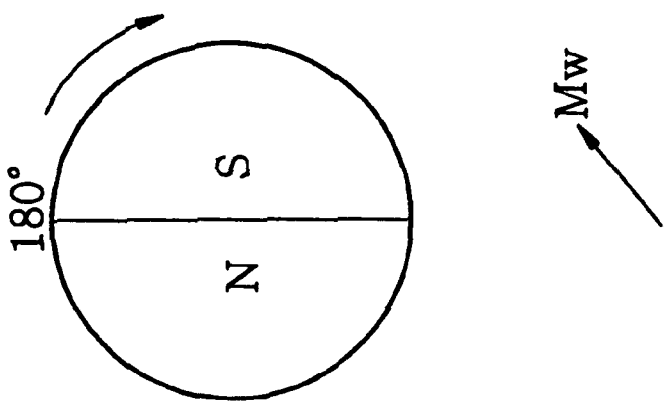
Figure 3F:
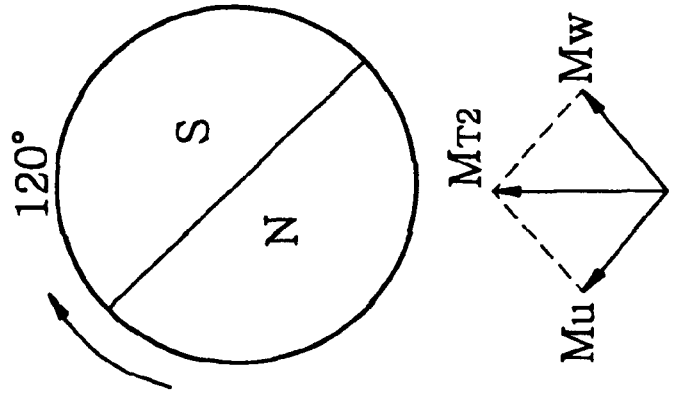
Figure 4A:
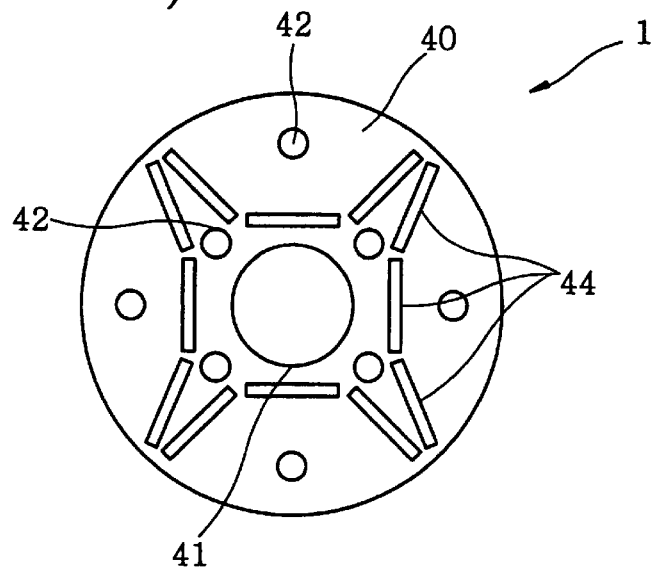
FIG. 4A illustrates a sheet iron used for the conventional brushless motor.
Figure 4B:
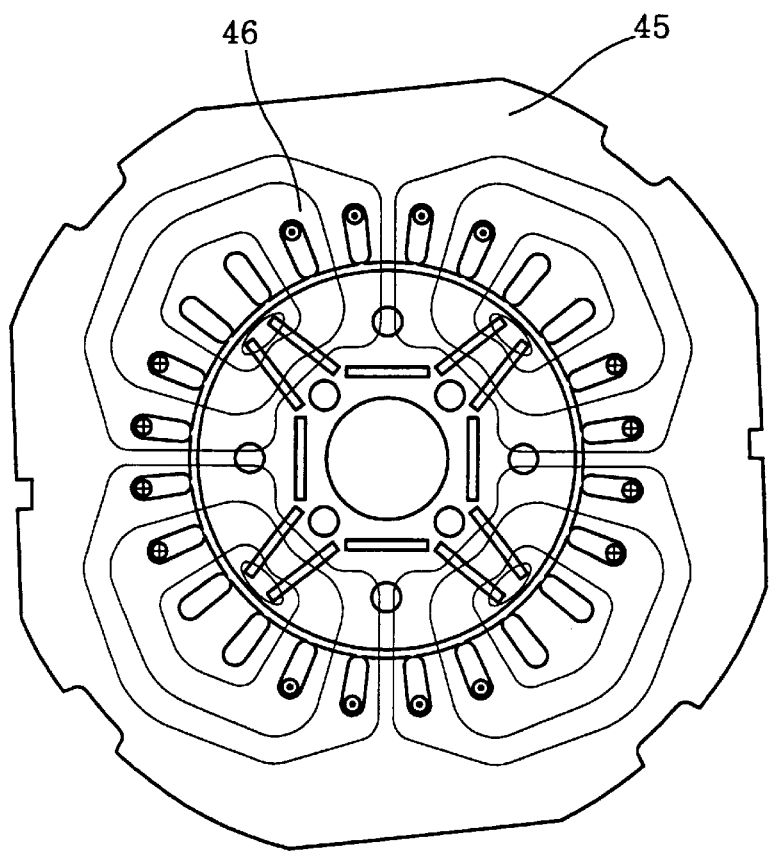
FIG. 4B is a section view showing the motor having the sheet iron shown in FIG. 4A.
Figure 5:
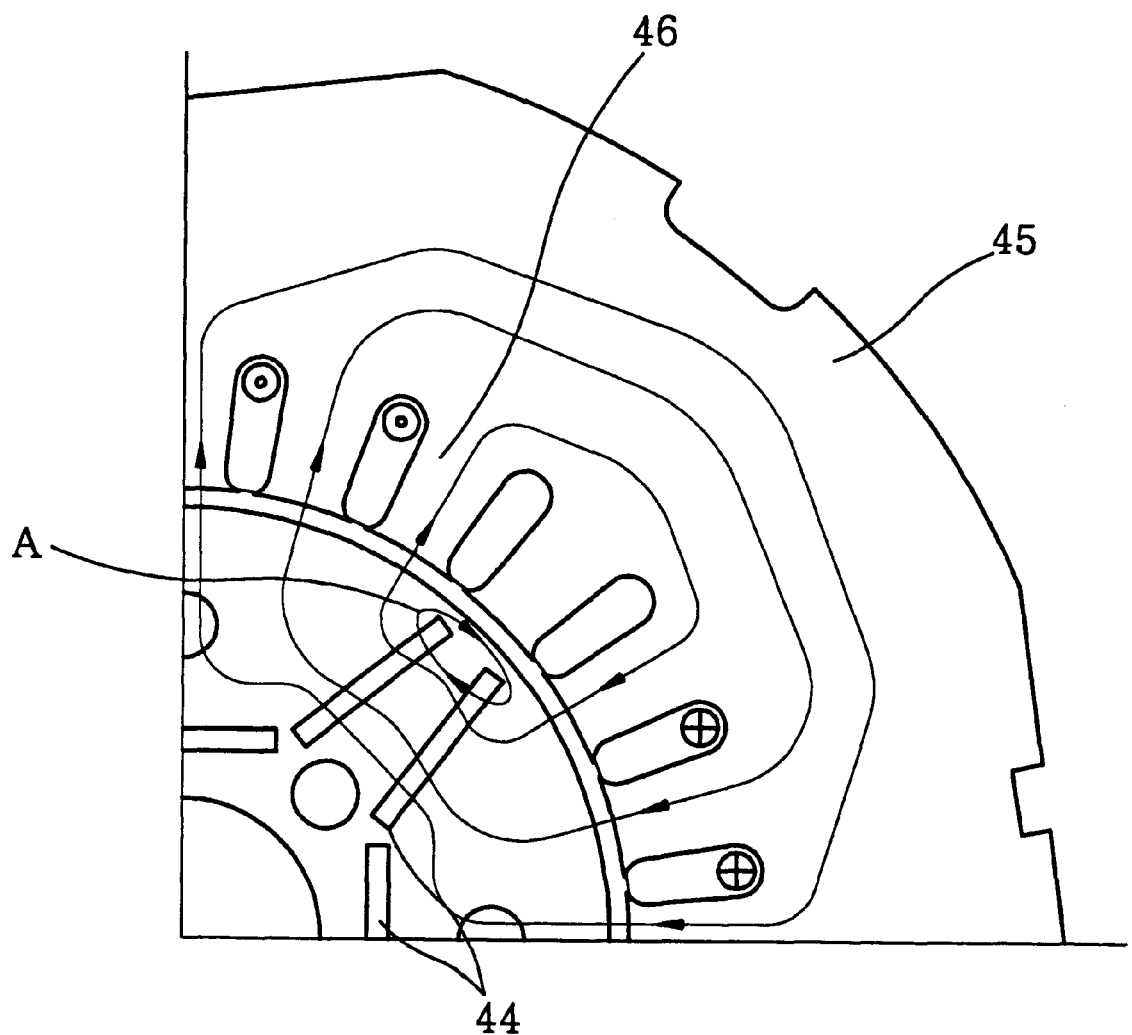
FIG. 5 is a detail view showing the magnetic flux generated from the permanent magnet of the motor shown in FIG. 4.
Figure 6A:
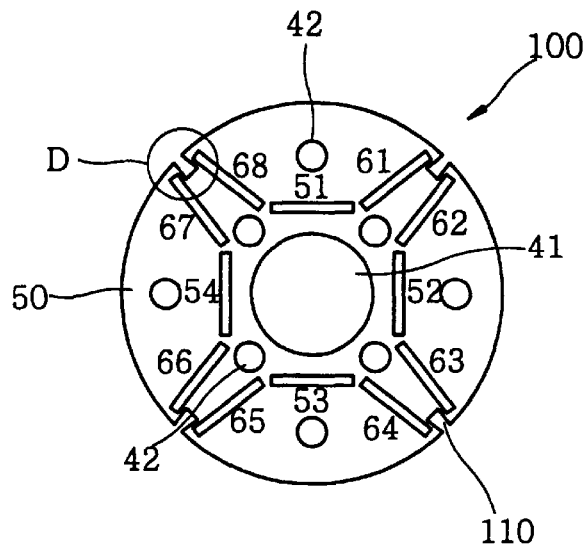
FIG. 6A is a plan view of the sheet iron according to an embodiment of the present invention.

Referring to FIGS. 6A, a sheet iron 50 of a 4 pole rotor 100 has at the center thereof a hole 41 into which a rotating shaft (not shown) is to be fixed, permanent magnets with a predetermined length and which are disposed oppositely and in parallel with the radius direction from the center of rotor 100, and first permanent magnet receiving slots 51 to 54 and second permanent receiving slots 61 to 68 which are formed in such a manner that four pairs of permanent magnets are disposed in ladder-shape toward the outer surface of sheet iron 50. Planar-type permanent magnets are fixed into magnet receiving slots 51 to 54 and 61 to 68. Preferably, the angle between two opposing permanent magnets disposed in ladder-shape is 120° to 170°, and more preferably, 150°, considering the smooth flow of the magnetic flux through the rotor.

Preferably, thickness of the permanent magnet is 2% to 8% of the circumference of the rotor, and the permanent magnets are disposed in such a manner that the magnetic poles of same polarity are opposed to each other by 180° centering from the rotating shaft.

For example, second permanent magnet receiving slots 67 and 68 are disposed to be more adjacent as they go away from the center toward the outer surface of the rotor.

A magnetic flux leakage preventive groove 110 shaped as a recess is formed at the outer surface of the rotor. Magnetic flux leakage preventive groove 110 is formed in such a manner that the center thereof is positioned at a point where the centerline between permanent magnetic receiving slots 67 and 68 crosses the circumference of the rotor.

Figure 6B:
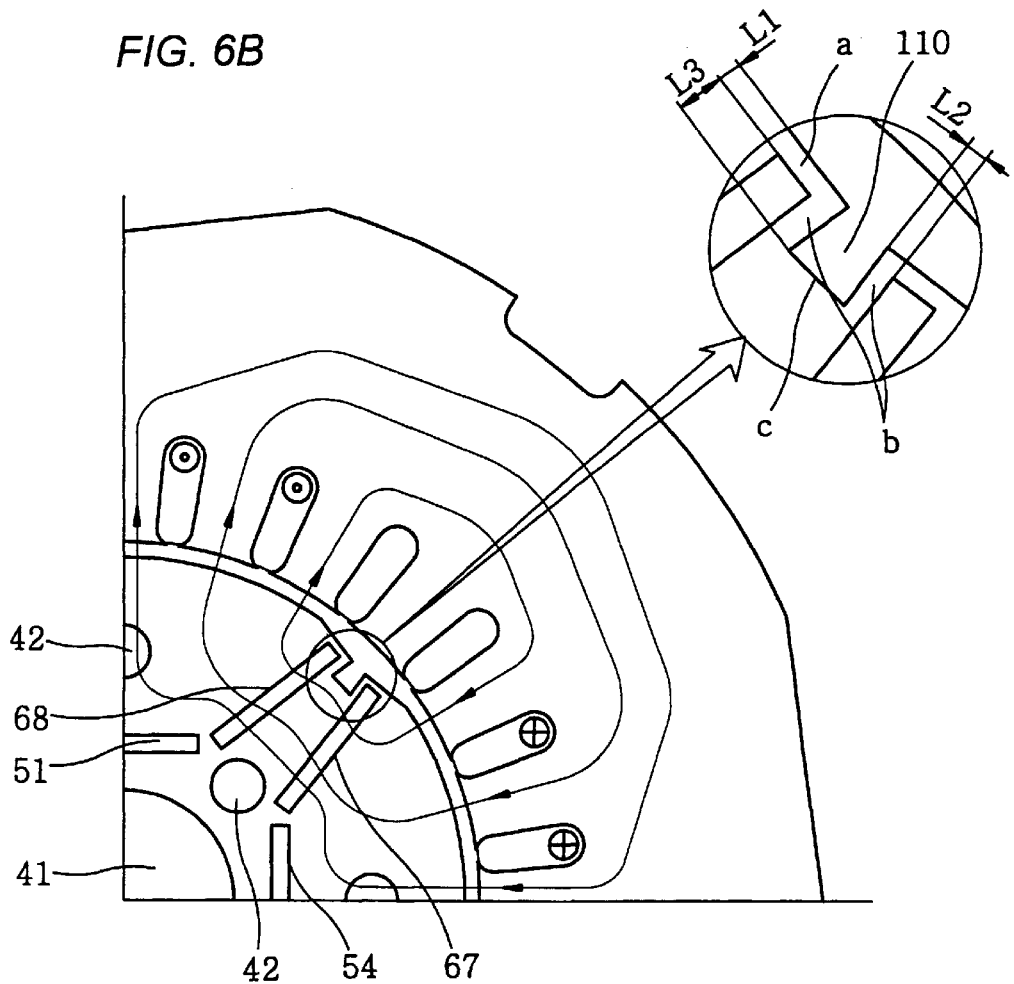
FIG. 6B is an enlarged view of the portion D of FIG. 6A.

Referring to FIG. 6B, magnetic flux leakage preventive groove 110 includes portion (a) between the end of permanent magnet receiving slot 68 and the outer surface of the rotor, portion (b) between the sidewall of permanent magnet receiving slot 63 and the sidewall of magnetic flux leakage preventive groove 110, and portion (c) which is the bottom surface of magnetic flux leakage preventive groove 110. Here, preferably, length L1 of portion (a), length L2 of portion (b), and length L3 which is the depth of magnetic flux leakage preventive groove 110 excluding length L1 are 0.5 mm or shorter, respectively. If they are longer than 0.5 mm, the magnetic flux leakage prevention effect will be decreased.

Length L3 is longer than the air gap between the stator and the rotor, which prevents the useless magnetic flux caused by the circular outer surface of the rotor, i.e., the magnetic flux leakage.

In some cases, length L3 is within a range that does not exceed the thickness of the permanent magnets, and the width of magnetic flux leakage preventive groove does not exceed 1.2 times of the thickness of the permanent magnets. In such a manner, the magnetic flux generated at the end of the magnet may not pass magnetic flux leakage preventive groove 110, and pass teeth 46 of stator 45.

An operation of the motor of the present invention operates as follows.

Figure 7A:
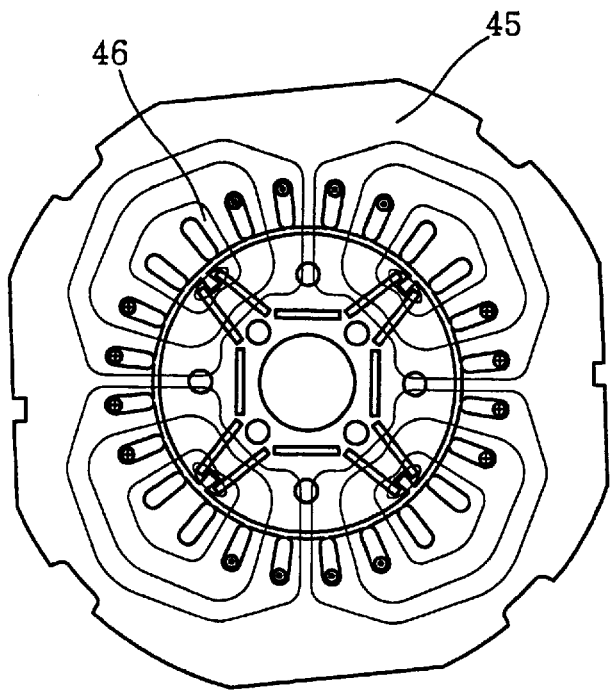
FIG. 7A illustrates the distribution of the magnetic flux when the permanent magnet is arranged according to the present invention.
Figure 7B:
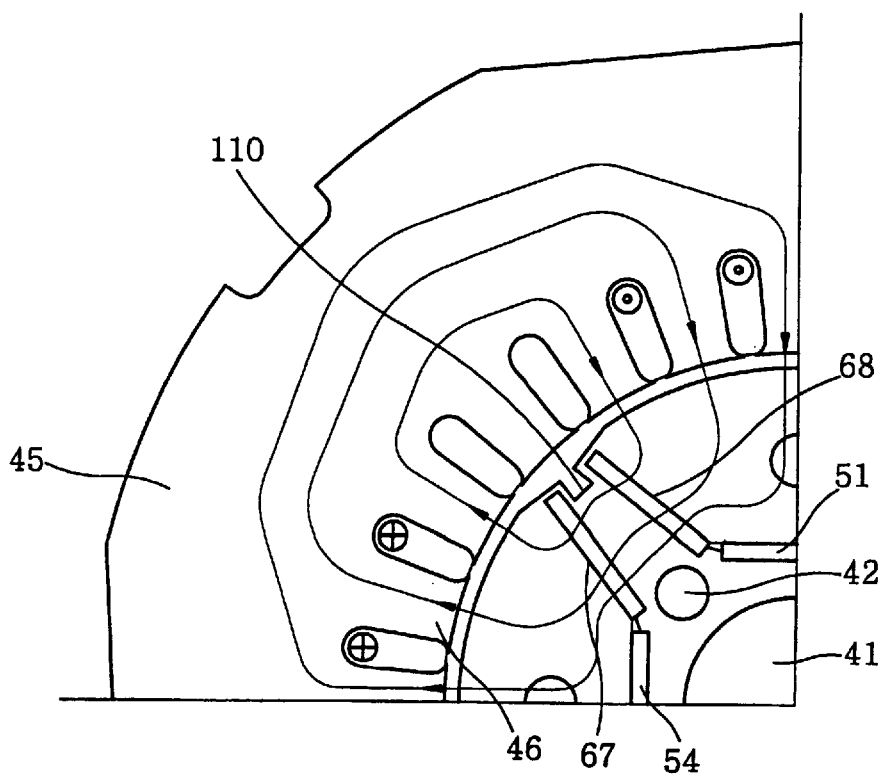
FIG. 7B is a detail view of the distribution of the magnetic flux shown in FIG. 7A.

Referring to FIGS. 7A and 7B, the magnetic flux passes through the air gap between the rotor and the stator, teeth 46, and the main body of rotor 100, and enters the adjacent permanent magnet of opposite polarity. The magnetic flux intends to flow via the medium having excellent magnetic permeability, and has less magnetic reluctance as the magnetic flux path is shorter. Therefore, it is preferable to make the magnetic circuit as short as possible. In addition, if the magnetic flux is distributed densely at a certain position, the magnetic reluctance increases. Therefore, it is preferable to uniformly distribute the magnetic flux.

As shown in FIGS. 7A and 7B, the magnetic flux is distributed uniformly, and specifically, in the rotor, the magnetic flux line in the magnet proceeds in one direction.

The magnetic flux leakage where the magnetic flux generated from the end of the permanent magnet directly passes the permanent magnets can be reduced by magnetic flux leakage preventive groove 110 which is designed to have a magnetic reluctance smaller than those between the permanent magnet and teeth 46 and those between the end of the permanent magnet and the end of the adjacent permanent magnet. Thereby, the magnetic flux leakage is reduced, and the magnetic flux generated from the end of the permanent magnet passes through teeth 46, which substantially enhances a motor efficiency.

According to the present invention, the amount of torque generated from the magnetomotive force of the stator is further increased than the conventional art assuming that the number of turns of coils and the current consumption are the same. In addition, the torque ripple is enhanced, too.

In the present invention, arrangement of magnets of the rotor is enhanced, and the magnetic flux leakage preventive groove having an appropriate size is formed at the outer surface of the rotor, to thereby reduce the magnetic flux leakage and the core loss in the rotor. Thus, an overheating during the operation of the motor is prevented, and the useful magnetic flux is increased. Ultimately, further large amount of torque can be achieved, and the motor can be operated in a high efficiency. The same amount of torque can be obtained with the reduced size of the motor. In addition, the magnetic reluctance can be reduced by making the path along which the magnetic flux flows to be short as possible. As a result, maximum amount of torque can be obtained with the same current of the stator.

In summary, grooves shaped as a recess are formed at the outer surface of the rotor to which the permanent magnets of different polarities are adjacently positioned, which minimize the magnetic flux leakage. A high torque can be obtained with the same power consumption, the torque ripple can be reduced, and the noise and the vibration can be minimized.

This invention has been described above with reference to the aforementioned embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A motor having permanent magnets received therein comprising a rotor having a plurality of circular iron sheets deposited on one another, a plurality of pairs of magnet receiving slots formed through said deposited sheets at a predetermined angle toward the outer surface of said rotor, and permanent magnets received in said magnet receiving slots such that opposite polarities thereof face one another, wherein a magnetic flux leakage preventive groove having a predetermined width and depth is formed at the outer surface of said rotor at the center between each pair of magnet receiving slots.

2. The motor according to claim 1, wherein a distance between an outer end of said magnet receiving slot and the outer surface of said rotor is 0.5 mm or shorter.

3. The motor according to claim 2, wherein a distance between a sidewall of said magnetic flux leakage preventive groove and a sidewall of said magnet receiving slot adjacent to said magnetic flux preventive groove is 0.5 mm or shorter.

* * * * *